(12) United States Patent
Toda

(10) Patent No.: US 8,849,029 B2
(45) Date of Patent: Sep. 30, 2014

(54) IMAGE PROCESSING METHOD, IMAGE PROCESSING DEVICE AND PROGRAM

(75) Inventor: Masato Toda, Tokyo (JP)

(73) Assignee: NEC Corporation, Tokyo (JP)

(*) Notice: Subject to any disclaimer, the term of this patent is extended or adjusted under 35 U.S.C. 154(b) by 109 days.

(21) Appl. No.: 13/579,782

(22) PCT Filed: Feb. 23, 2011

(86) PCT No.: PCT/JP2011/053898
§ 371 (c)(1),
(2), (4) Date: Aug. 17, 2012

(87) PCT Pub. No.: WO2011/105391
PCT Pub. Date: Sep. 1, 2011

(65) Prior Publication Data
US 2012/0321185 A1    Dec. 20, 2012

(30) Foreign Application Priority Data

Feb. 26, 2010    (JP) .............................. JP2010-042289

(51) Int. Cl.
*G06K 9/40*    (2006.01)
*G06T 3/40*    (2006.01)

(52) U.S. Cl.
CPC ................................... *G06T 3/4053* (2013.01)
USPC ............ 382/167; 382/162; 382/274; 382/232

(58) Field of Classification Search
CPC ............. G06K 9/46; G06K 9/36; G06K 9/40;
G06K 9/44; G06K 9/00369; G06T 5/001;
G06T 5/00; G06T 2207/10016; G06T 7/2006;
G06T 2207/10024
USPC .......... 382/382, 236, 232, 162, 167; 358/518,
358/519, 520, 521, 522, 523
See application file for complete search history.

(56) References Cited

U.S. PATENT DOCUMENTS

2007/0279494 A1* 12/2007 Aman et al. ................... 348/169
2009/0225200 A1*  9/2009 Ohki ............................. 348/241
(Continued)

FOREIGN PATENT DOCUMENTS

CN          1445982 A      10/2003
CN          1534547 A      10/2004
(Continued)

OTHER PUBLICATIONS

Park, Sung Cheol et al., "Super-Resolution Image Reconstruction: A Technical Overview", IEEE Signal Processing Magazine (May 2003), vol. 20, No. 3, pp. 21-36.

(Continued)

*Primary Examiner* — Ali Bayat
(74) *Attorney, Agent, or Firm* — Scully, Scott, Murphy & Presser, P.C.

(57) ABSTRACT

A plurality of images are used as input images. On the basis of a degree of similarity to an input image group and an evaluation of the quantity of edges of an overall image, a new image is generated. An image processing method may comprise calculating a specified color characteristic degree indicating a degree of similarity between a pixel color of a generated image predicted from the input image group and a specified color that has been specified beforehand, and for, on the basis of the specified color characteristic degree, modifying a weight corresponding to the edge quantity of each pixel within the generated image, and generating an image wherein the manner of reproduction of edges of areas of the specified color differs from other regions.

9 Claims, 7 Drawing Sheets

(56) References Cited

U.S. PATENT DOCUMENTS

| | | |
|---|---|---|
| 2010/0002908 A1* | 1/2010 | Miyamoto et al. ............ 382/103 |
| 2010/0033579 A1* | 2/2010 | Yokohata et al. ............ 348/169 |
| 2010/0158398 A1* | 6/2010 | Noguchi et al. ............ 382/232 |

FOREIGN PATENT DOCUMENTS

| | | |
|---|---|---|
| CN | 101431683 A | 5/2009 |
| JP | 10-069537 | 3/1998 |
| JP | 2004-303193 | 10/2004 |
| JP | 2005-352720 | 12/2005 |
| JP | 2010-152518 | 7/2010 |
| TW | 200926061 A | 6/2009 |

OTHER PUBLICATIONS

International Search Report dated Apr. 19, 2011 issued in PCT/JP2011/053898.

Chinese Official Action and Search Report dated Mar. 31, 2014 in corresponding Chinese Application No. 201180008707.1.

* cited by examiner

IMAGE PROCESSING METHOD, IMAGE PROCESSING DEVICE AND PROGRAM

TECHNICAL FIELD

The present invention relates to an image processing method, an image processing device, and a program therefor.

BACKGROUND ART

There exists a technique for enhancement of an image resolution that synthesizes a plurality of low-resolution images with a positional displacement having an identical scene photographed therein to generate a high-resolution image.

For example, a technique for enhancement of the image resolution that performs detection (motion estimation) of the positional displacement between the inputted low-resolution images with accuracy smaller than a pixel unit (sub-pixel accuracy), and estimates a high-resolution image x that minimizes an evaluation function g(x) represented by Equation (1) when synthesizing the low-resolution images is described in Non-patent literature 1.

[Numerical equation 1]

$$g(x) = \sum_{\forall n} (\|y_n - A_n x\|^2) + \lambda \|C(x)\| \quad (1)$$

In the above-mentioned Equation (1), x denotes a high-resolution image, y denotes an input low-resolution image, A denotes an image transformation matrix including motions between the images, down-sampling and so forth, C is a high-pass filter, and λ is a pre-configured constant.

A first term in the right-hand side of the Equation 1 is a term indicative of an error between the input low-resolution image to be estimated from the high-resolution image x and the actually inputted low-resolution image, and a second term in the right-hand side is a normalization term founded on a condition that the high-resolution image to be generated is smooth and signifies an edge amount of the high-resolution image. For this, the high-resolution image x to be generated has an inclination that the edges thereof become clearer as a whole as the value of the constant λ is smaller, and to the contrary, the edges thereof becomes relatively blurred as the value of a constant λ is larger.

In general, such a process for enhancement of the image resolution is called a super-resolution process.

As a technology using this technique for enhancement of the image resolution so far, there exist the following technologies.

1. The technology of separating the photographed video image into a high-frequency component and a low-frequency component, applying the super-resolution process to the high-frequency region image, and combining the image generated by applying a super-resolution process to the high-frequency component image with the image generated by applying an interpolation and enlargement process to the low-frequency component image (Patent literature 1).

2. The technology of, for each object within the images, performing an image layout structure analysis such as features of the object and a relative positional relation among the objects, and performing correspondence of layout structure information, thereby to detect a position deviation amount among the frame images, and enhancing the resolution of the images (Patent literature 2).

Hereinafter, one example of the super-resolution processing device related to the present invention is shown.

FIG. 7 is a block diagram of a super-resolution processing device 10 for generating the high-resolution image by synthesizing a plurality of low-resolution images.

This super-resolution processing device includes motion estimating means 11 and high-resolution image estimating means 12.

The motion estimating means 11 receives a plurality of the low-resolution images as inputs and estimates motion of the pixel between a reference low-resolution image, which is subjected to the enhancement of the image resolution, and a to-be-referenced low-resolution image for each pixel thereof with sub-pixel accuracy, and outputs an estimation result.

The high-resolution image estimating means 12 receives the low-resolution images and the motion estimation results as inputs, and estimates and outputs the high-resolution image that minimizes an evaluation function represented by Equation (1) from these items of information.

By the way, as one of the processes for enhancing an image quality, there exists the image process called a beautiful skin process. The so-called beautiful skin process is a process of reproducing a skin of a subject figure beautifully and smoothly by paying attention to a face area, being a most noticeable part in a figure picture.

For example, Patent literature 3 detects a skin color of the subject figure from the inputted images, and synthesizes, for an area with a skin color similar to the detected skin color, the input image and the input image subjected to a smoothing process responding to likelihood of the above skin color (which is referred to as a color intensity of the skin in the Patent literature 3), thereby to smooth only the skin area. Additionally, in the following explanation, it is assumed that the skin color likelihood is called a skin color characteristic degree.

The patent literature 3 calculates a skin color characteristic degree hx (i) in a pixel position i as shown in Equation (2) using values L (i), a(i), and b(i) having a pixel value in the above pixel expressed with a Lab color system therein. Wherein, L', a', and b' denote the center of gravity of the Lab value in the skin color area, and WL, Wa, and Wb denote a weight. The skin color characteristic degree hx has a value of 0.0 to 1.0, and it is meant that the skin color likelihood is yielded as the value of the skin color characteristic degree hx approaches 1.0.

[Numerical equation 2]

$$hx(i) = \exp\left[-\left\{\left(\frac{L' - L(i)}{W_L}\right)^2 + \left(\frac{a' - a(i)}{W_a}\right)^2 + \left(\frac{b' - b(i)}{W_b}\right)^2\right\}\right] \quad (2)$$

One example of the beautiful skin processing device related to the present invention is shown. FIG. 8 is a block diagram prepared based on description of the beautiful skin processing device related to the present invention.

The beautiful skin processing device related to the present invention includes skin color characteristic degree calculating means 21 and smoothing processing means 22. The skin color characteristic degree calculating means 21 detects the skin color of the subject figure within the inputted image, and calculates and outputs, for each pixel within the image, the skin color likelihood thereof. The smoothing processing means 22 generates the output image by synthesizing the input image and the input image generated in the inside that has been subjected to the smoothing process, using the skin color characteristic degree of each pixel calculated by the skin color characteristic degree calculating means 21.

The image processing device for executing both of the super-resolution process and the beautiful skin process can be realized by linking the related super-resolution processing device and beautiful skin processing device described above as shown in a block diagram of FIG. 9. In the image processing device shown in FIG. 9, at first, super-resolution processing device 10 generates one high-resolution image from a plurality of the low-resolution images using the related super-resolution processing technique. Next, beautiful skin processing device 20 subjects the generated high-resolution image to the beautiful skin process, and outputs the output images.

CITATION LIST

Patent Literature

PTL 1: JP-2005-352720A
PTL 2: JP-H10-69537A
PTL 3: JP-2004-303193A

Non-Patent Literature

N-PTL 1: S. C. Park and M. K. Park and M. G Kang, "Super-Resolution Image Reconstruction: A Technical Overview", IEEE Signal Processing Magazine, vol. 20, no. 3, pp. 21-36, May 2003

SUMMARY OF INVENTION

Technical Problem

The above-described related arts have a problem that the high-quality synthesized image cannot be generated. The reason is that the above-described super-resolution processing device can control smoothness of the edges in an entirety of the image when generating the high-resolution image; however, it cannot change the smoothness of the edges only for a specific area such as the skin color area within the image.

As shown in a block diagram of FIG. 9, performing the process such as the beautiful skin process after the super-resolution process makes it possible to change the smoothness of the edges only for a specific area within the image. However, in the rear-stage process, the processing method cannot take into consideration such conformity with the input low-resolution images that is executed at the time of the super-resolution process. For this, the smooth edges within the input low-resolution images that originally should be reproduced might be lost due to the smoothing process, and as a result, the image quality of the output image deteriorates.

Thereupon, an object thereof lies in a point of providing an image processing process that generates the high-quality output image in which both of the conformity with the input image and the re-productivity of the edges for a specific area within the image have been simultaneously taken into consideration, an image processing device therefor and a program therefor.

Solution to Problem

The present invention is an image processing method of receiving a plurality of images as inputs, and generating a new image based on a similarity of the plurality of the input images and an evaluation of an edge amount in an entirety of the image, comprising; estimating a designation color characteristic degree indicative of a similarity between a pixel color of a generated image to be predicted from the plurality of the input images and a pre-designated designation color; and changing a weight for the edge amount of each pixel within the image to be generated, based on said designation color characteristic degree, and generating the image in which an area of said designation color differs from other areas in a manner of reproduction of edges.

The present invention is an image processing device for receiving a plurality of images as inputs, and generating a new image based on a similarity of the plurality of the input images and an evaluation of an edge amount in an entirety of the image, comprising; designation color characteristic degree calculating means that estimates a designation color characteristic degree indicative of a similarity between a pixel color of a generated image to be predicted from the plurality of the input images and a pre-designated designation color; and image generating means that changes a weight for the edge amount of each pixel within the image to be generated, based on said designation color characteristic degree, and generates the image in which an area of said designation color differs from other areas in a manner of reproduction of edges.

The present invention is an program of an information processing device for receiving a plurality of images as inputs, and generating a new image based on a similarity of the plurality of the input images and an evaluation of an edge amount in an entirety of the image, said program causing the information processing device to execute: a designation color characteristic degree estimating process of estimating a designation color characteristic degree indicative of a similarity between a pixel color of a generated image to be predicted from the plurality of the input images and a pre-designated designation color; and an image generating process of changing a weight for the edge amount of each pixel within the image to be generated, based on said designation color characteristic degree, and generating the image in which an area of said designation color differs from other areas in a manner of reproduction of edges.

Advantageous Effect of Invention

The present invention makes it possible to generate the high-quality output image in which both of the conformity with the input image and the re-productivity of the edges for a specific area within the image have been simultaneously taken into consideration.

DESCRIPTION OF EMBODIMENTS

First Exemplary Embodiment

The first exemplary embodiment of the present invention will be explained.

Additionally, in the explanation of the first exemplary embodiment, the explanation is made on the assumption that the pre-designated designation color is a skin color.

Figure 1:
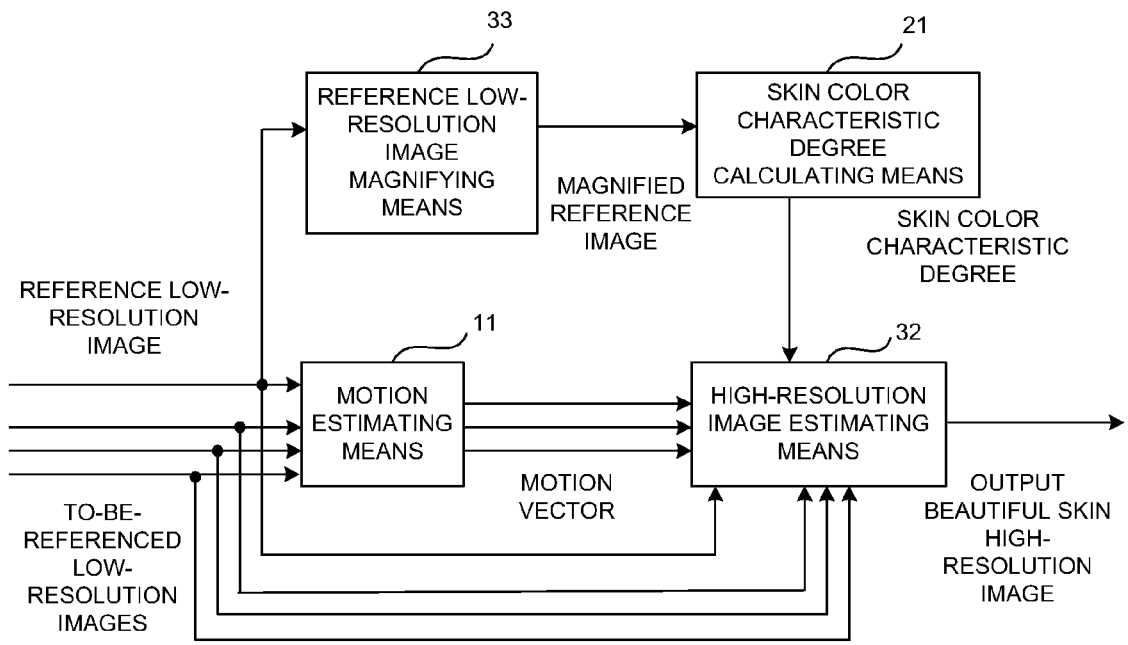
FIG. 1 is a block diagram illustrating a constitution of a first exemplary embodiment of the present invention.

FIG. 1 is a block diagram illustrating a constitution of a first exemplary embodiment of the present invention.

The image processing device of the first exemplary embodiment shown in FIG. 1, which includes motion estimating means 11, reference low-resolution image magnifying means 33, skin color characteristic degree calculating means 21, and high-resolution image estimating means 32, receives the low-resolution images of a pixel number M (image number N) as inputs, and outputs the high-resolution images (pixel number K) subjected to the beautiful skin process.

The motion estimating means 11 executes an operation similar to that of the motion estimating means of the above-described super-resolution processing device. That is, the motion estimating means 11 receives N pieces of the low-resolution images as inputs, estimates the motion of the pixel between the reference low-resolution image, which is subjected to the enhancement of the image resolution, and the remaining (N−1) pieces of the to-be-referenced low-resolution images for each pixel thereof with sub-pixel accuracy, and outputs the estimated motion vectors.

The reference low-resolution image magnifying means 33 magnifies the reference low-resolution image to be subjected to the enhancement of the image resolution using an interpolation technique such as a Bi-cubic technique, and generates the magnified reference image having a size identical to that of the output high resolution image. Generating the magnified reference image makes it possible to previously predict the color of each pixel within the final output high-resolution image.

The skin color characteristic degree calculating means 21 receives the magnified reference images generated by the reference low-resolution image magnifying means 33 as inputs, detects the skin color of the subject figure within the image, and calculates the skin color characteristic degree hx in each pixel of the magnified reference image. Wherein, the skin color characteristic degree hx denotes an extent indicative of the skin color likelihood, and becomes an extent to which the color of the pixel resembles the skin color, being the designation color. That is, when the color characteristic degree of the pixel is 1.0, the color of the above pixel is regarded as the skin color of the designation color, and the color of the above pixel approaches the color different from the skin color of the designation color as the skin color characteristic degree approaches zero, and the color of the above pixel becomes a color different from the skin color of the designation color when the skin color characteristic degree of the pixel is zero.

As one example of the method of calculating the skin color characteristic degree, the calculation method described in the Patent literature 3 as shown in the Equation (2), the calculation method described in Patent literature 4, and the like may be used. The Patent literature 4 (JP-H10-198795) calculates the skin color characteristic degree hx (i) in the pixel position using values H (i), S(i), and V(i) having the pixel value of the above pixel expressed with an HSV color system therein, as shown in Equation (3) and Equation (4). Wherein, H', S', and V' denotes the center of gravity of the HSV value in the skin color area, and m, m1, and m2 denotes a pre-configured parameter. Additionally, in the calculation by the Equation (3) and the Equation (4), zero is configured for the value of hx (i) when the value of m−|H'−H(i)|, m1−|S'−S(i)|, or m2−|V'−V (i)| is less than zero.

[Numerical equation 3]

$$hx(i) = \frac{m - |H' - H(i)|}{m} \cdot S(i) \cdot V(i) \quad (3)$$

[Numerical equation 4]

$$hx(i) = \frac{m - |H' - H(i)|}{m} \cdot \frac{m1 - |S' - S(i)|}{m1} \cdot \frac{m2 - |V' - V(i)|}{m2} \quad (4)$$

Figure 6:
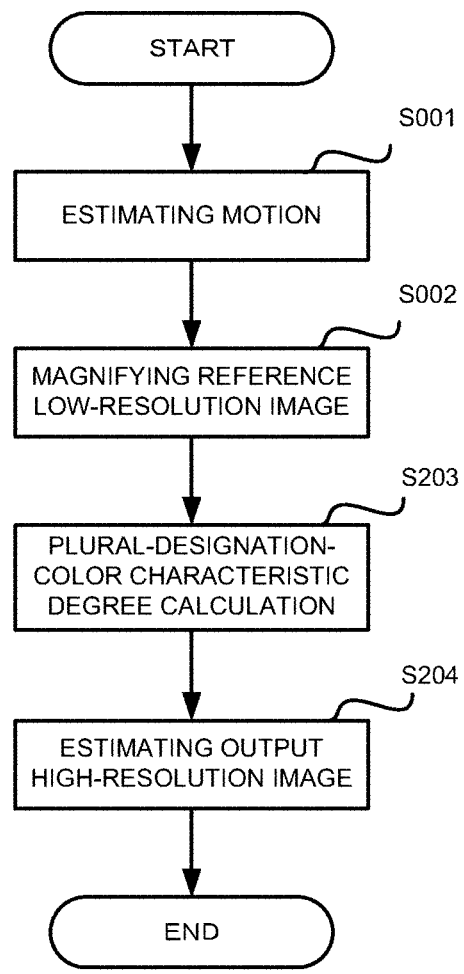
FIG. 6 is a flowchart of the third exemplary embodiment.
Figure 7:
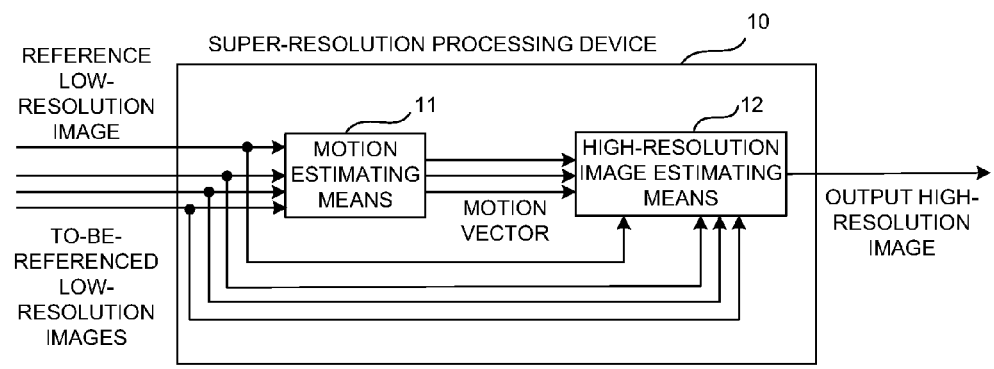
FIG. 7 is a block diagram of the high-resolution processing device for generating the high-resolution image by synthesizing a plurality of the low-resolution images.
Figure 8:
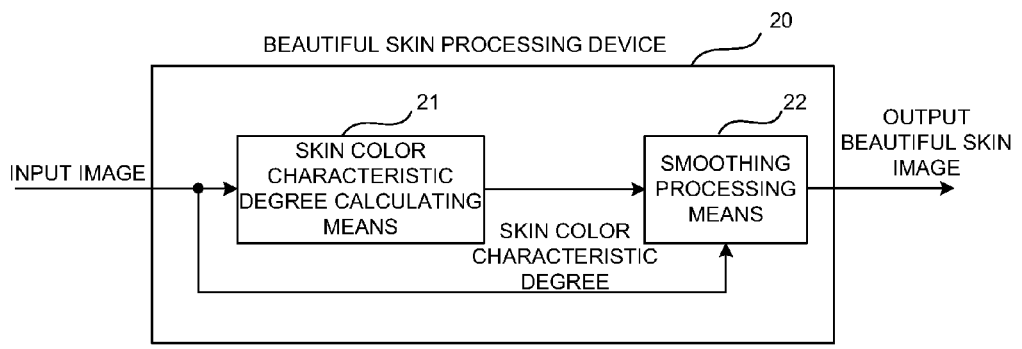
FIG. 8 is a block diagram prepared based on the description of the beautiful skin processing device related to the present invention.
Figure 9:
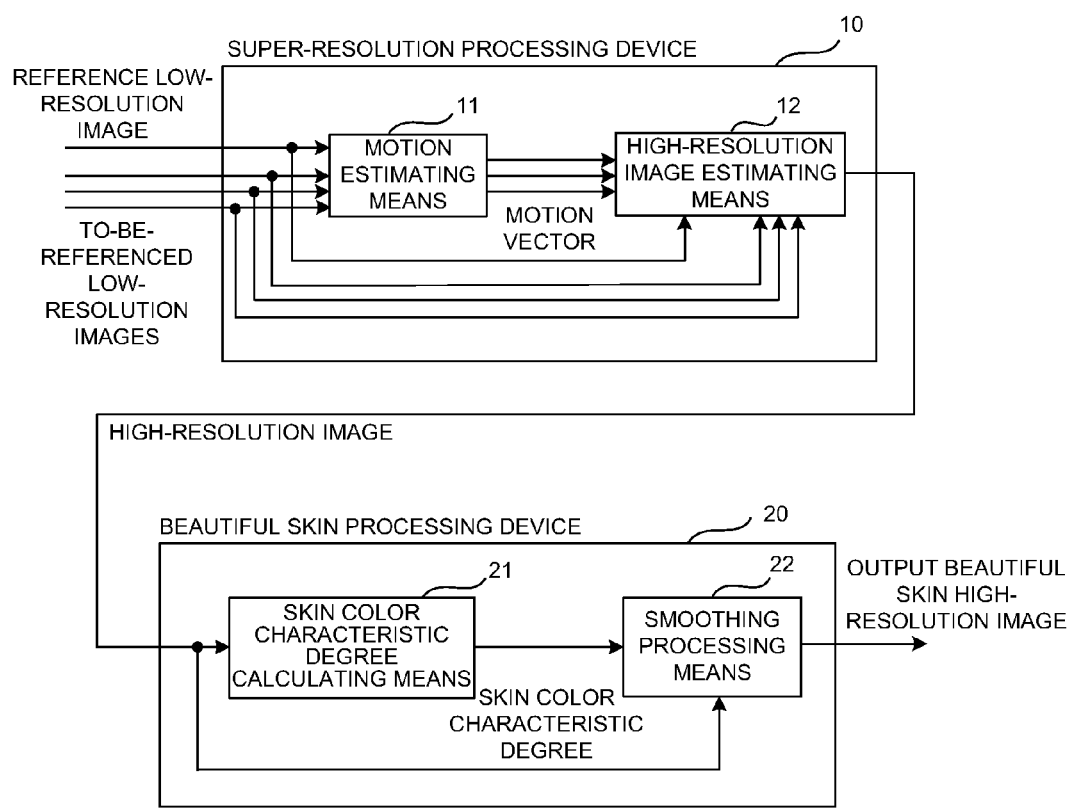
FIG. 9 is a block diagram in a case of linking the related super-resolution processing device and beautiful skin processing device.

The high-resolution image estimating means 32 receives the input low-resolution images, the motion vectors estimated by the motion estimating means 11, and the skin color characteristic degrees calculated by the skin color characteristic degree calculating means 21 as inputs, and generates the high-resolution image subjected to the beautiful skin process by estimating the high-resolution image x that minimizes an evaluation function $g1(x)$ represented by Equation (5). Wherein, $\hat{\Lambda}$ denotes a diagonal matrix of K×K and is calculated by using the inputted skin color characteristic degrees as shown in FIG. 6. Further, i denotes a pixel position within the high-resolution image, and λskin (λ<λskin) denotes a pre-configured constant indicative of an intensity of the normalization term in the skin color area. Additionally, the so-called skin color area denotes an area that the pixel of which the skin color characteristic degree is not zero occupies.

[Numerical equation 5]

$$g_1(x) = \sum_{\forall n} (\|y_n - A_n x\|^2) + \|\Lambda C(x)\| \quad (5)$$

[Numerical equation 6]

$$\Lambda(i,i) = (1.0 - hx(i))\lambda + hx(i)\lambda_{skin} \quad (6)$$

The high-resolution image estimating method using the Equation (5), as compared with the high-resolution image estimating method using the Equation (1), differs in a point that the constant λ is replaced with the diagonal matrix $\hat{\Lambda}$. Each diagonal element of the diagonal matrix $\hat{\Lambda}$ is indicative of the intensity of the normalization term in each pixel of the output high-resolution image. According to the Equation (6), λskin having a relatively large value is configured for a diagonal component corresponding to the pixel having a skin color characteristic degree of 1.0, namely, the pixel of which the color is completely regarded as the skin color. This means that intensifying an influence of the normalization term for estimating the high-resolution image in the above pixel allows the above pixel to be smoothly reproduced, which can yield an effect similar to that of the smoothing process of correcting the beautiful skin.

Further, the value λ indicative of the intensity of the normalization term in the super-resolution processing device related to the present invention described above is configured for the diagonal component corresponding to the pixel having a skin color characteristic degree of 0.0, whereby a pixel value resembling that of the super-resolution processing device related to the present invention can be estimated. For this, all diagonal elements of the diagonal matrix ^ become λ, and the Equation (5) becomes equivalent to the Equation (1) when the skin color area is not present within the reference image.

Further, a configuration is made so that the diagonal component corresponding to the pixel of which the skin color characteristic degree is a value other than it approaches λskin as the skin color characteristic degree approaches 1.0, and to the contrary, it approaches λ as the skin color characteristic degree approaches 0.0.

Additionally, as one example of λskin, the value of two times as large as the value of λ manually pre-configured responding to a noise amount within the image is configured. That is, 0.1 is configured for λskin when λ is 0.05, and 0.2 is configured for λskin when λ is 0.1. Thus, the diagonal component corresponding to the pixel having a skin color characteristic degree of 1.0, namely, the pixel of which the color is completely regarded as the skin color is 0.2 when λ is 0.05, and a configuration is made so that the value of the diagonal component approaches 0.1 as the skin color characteristic degree approaches 0.0.

Additionally, the Equation (6) is one example for determining each diagonal element of the diagonal matrix ^, and the diagonal element may be determined using other functions in which λskin is calculated when the skin color characteristic degree is 1.0, and λ is calculated when the skin color characteristic degree is 0.0.

Figure 2:
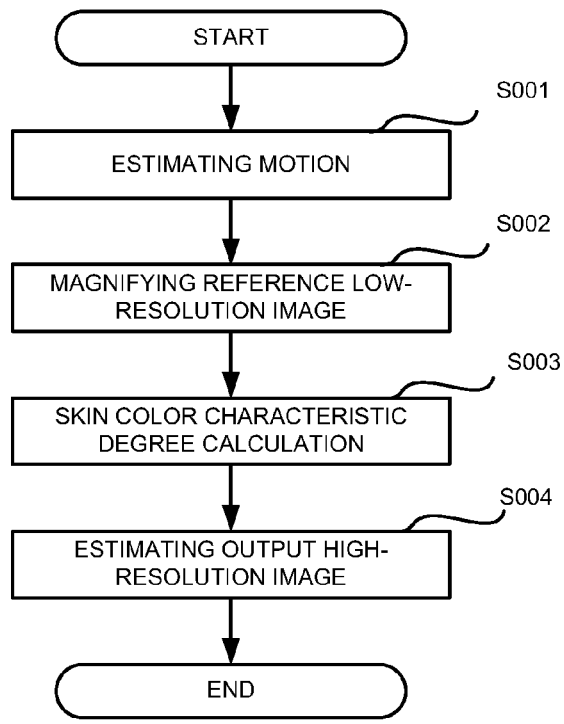
FIG. 2 is a flowchart of the first exemplary embodiments.

Next, an operation of an entirety of the first exemplary embodiment will be explained by referencing FIG. 1 and a flowchart of FIG. 2.

At first, the motion estimating means 11 receives N pieces of the low-resolution images as inputs, estimates the motion of the pixel between the reference low-resolution image, which is subjected to the enhancement of the image resolution, and the remaining (N−1) pieces of the to-be-referenced low-resolution images for each pixel thereof with sub-pixel accuracy, and outputs the estimated motion vectors (S001).

The reference low-resolution image magnifying means 33 magnifies the reference low-resolution image to be subjected to the enhancement of the image resolution, using the interpolation technique such as a Bi-cubic technique, and generates the magnified reference image having a size identical to that of the output high resolution image (S002).

The skin color characteristic degree calculating means 21 calculates the skin color characteristic degree hx in each pixel of the magnified reference image (S003).

The high-resolution image estimating means 32 generates the high-resolution image subjected to the beautiful skin process by estimating the high-resolution image that minimizes the evaluation function g1(x) (S004).

In such a manner, in the first exemplary embodiment, adaptively changing the intensity of the normalization term at the time of estimating the high-resolution image responding to the skin color characteristic degree for each pixel makes it possible to realize the enhancement of the image resolution including the beautiful skin process for smoothing the skin color area.

Second Exemplary Embodiment

The second exemplary embodiment will be explained.

Figure 3:
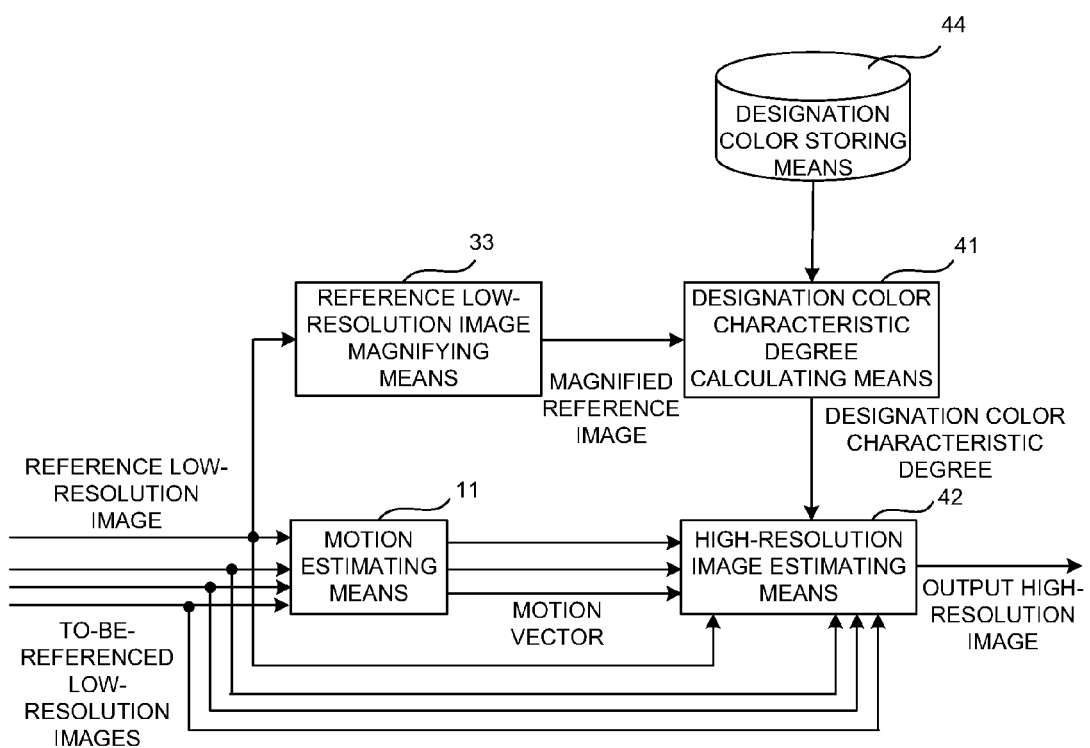
FIG. 3 is a block diagram illustrating a constitution of a second exemplary embodiment.

FIG. 3 is a block diagram illustrating a constitution of the second exemplary embodiment.

The image processing device of the second exemplary embodiment shown in FIG. 3 is constituted of motion estimating means 11, reference low-resolution image magnifying means 33, designation color characteristic degree calculating means 41, and designation color storing means 44, and high-resolution image estimating means 42. The image processing device of the second exemplary embodiment, as compared with the constitution of the first exemplary embodiment, differs in a point that the designation color storing means 44 is added and further, the designation color characteristic degree calculating means 41 and the high-resolution image estimating means 42 differ in its operation.

The second exemplary embodiment does not execute the beautiful skin correction by smoothing the skin color area, but generates the high-quality high-resolution image by calculating the characteristic degree hx' for the color stored by the designation color storing means 44 and changing the smoothness for the designation color area.

Hereinafter, operations of the designation color characteristic degree calculating means 41 and the high-resolution image estimating means 42 will be explained in details.

The designation color characteristic degree calculating means 41 receives the magnified reference images generated by the reference low-resolution image magnifying means 33 as inputs, and calculates the characteristic degree (designation color characteristic degree) hx' for the color recorded in the designation color storing means 44 with regard to each pixel of the magnified reference image.

The designation color characteristic degree hx', similarly to the skin color characteristic degree hx, has a value of 0.0 to 1.0, and it is meant that the color of the pixel approaches the color recorded in the designation color storing means 44 as the designation color characteristic degree hx' approaches 1.0. That is, when the designation color characteristic degree of the pixel is 1.0, the color of the above pixel is regarded as the designation color, the color of the pixel approaches the color different from the designation color as the designation color characteristic degree of the pixel approaches zero, and, the color of the above pixel becomes the color different from the designation color when the designation color characteristic degree of the pixel is zero. The designation color characteristic degree hx' can be calculated by replacing the information related to the skin color that is used at the time of calculating the skin color characteristic degree hx with the color recorded in the designation-color storing means 44. Hereinafter, it is assumed that the designation color characteristic degree of the pixel position i in the high-resolution image is described as hx'(i).

The high-resolution image estimating means 42 receives the input low-resolution images, the motion vectors estimated by the motion estimating means 11, and the designation color characteristic degrees calculated by the designation color characteristic degree calculating means 41 as inputs, and estimates the high-resolution image x that minimizes an evaluation function g2(x) represented by Equation (7). Wherein, ^2 denotes a diagonal matrix of K×K and is calculated using the inputted characteristic degree like Equation (8). Further, i denotes a pixel position within the high-resolution image, and λ' denotes a pre-configured constant indicative of the intensity of the normalization term in the designation color area.

[Numerical equation 7]

$$g_2(x) = \sum_{\forall n} (\|y_n - A_n x\|^2) + \|\Lambda_2 C(x)\| \quad (7)$$

[Numerical equation 8]

$$\Lambda_2(i,i) = (1.0 - hx'(i))\lambda + hx'(i)\lambda' \quad (8)$$

Figure 4:
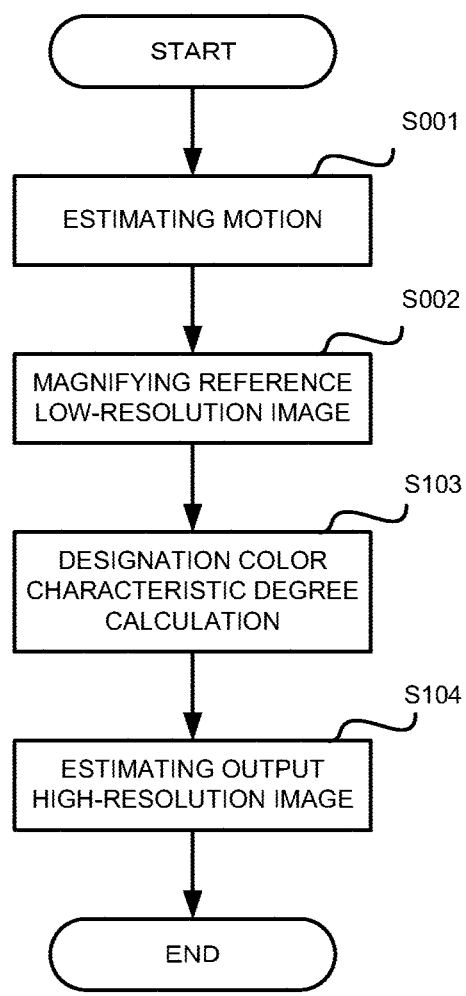
FIG. 4 is a flowchart of the second exemplary embodiment.

Next, an operation of an entirety of the second exemplary embodiment will be explained by referencing FIG. 3 and a flowchart of FIG. 4.

At first, the motion estimating means 11 receives N pieces of the low-resolution images as inputs, estimates the motion of the pixel between the reference low-resolution image, which is subjected to the enhancement of the image resolution, and the remaining (N−1) pieces of the to-be-referenced low-resolution images for each pixel thereof with sub-pixel accuracy, and outputs the estimated motion vectors (S001).

The reference low-resolution image magnifying means 33 magnifies the reference low-resolution image to be subjected to the enhancement of the image resolution, using the interpolation technique such as a Bi-cubic technique, and generates the magnified reference image having a size identical to that of the output high resolution image (S002).

The designation color characteristic degree calculating means 41 calculates the characteristic degree (designation color characteristic degree) hx' for the color stored in the designation color storing means 44 in each pixel of the magnified reference image (S103).

The high-resolution image estimating means 42 generates the high-quality high-resolution image by estimating the high-resolution image that minimizes the evaluation function $g2(x)$ (S104).

By using a constitution of the second exemplary embodiment, for example, a green color of plants is recoded as the designation color in the designation color recording means 44, and a relative small value is configured for λ', thereby making it possible to reproduce the areas such as leaves of trees and plains within the image more sharply, and to emphasize a feeling of activity of this area.

Third Exemplary Embodiment

Figure 5:
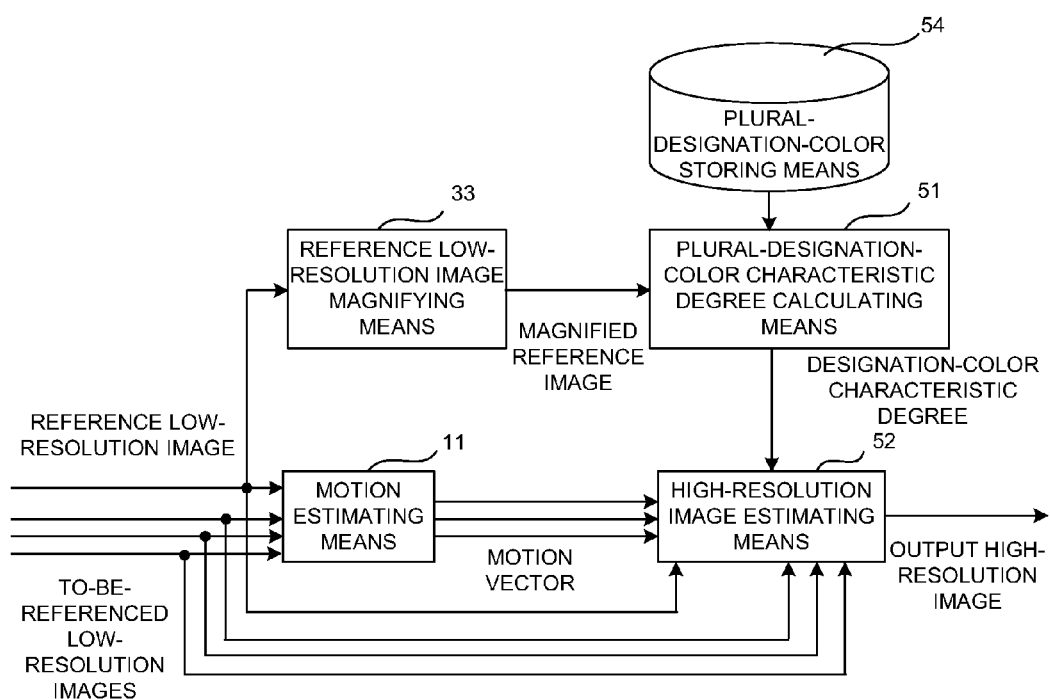
FIG. 5 is a block diagram illustrating a constitution of a third exemplary embodiment.

FIG. 5 is a block diagram illustrating a constitution of the third exemplary embodiment.

The image processing device of the third exemplary embodiment shown in FIG. 5 is constituted of motion estimating means 11, reference low-resolution image magnifying means 33, plural-designation-color characteristic degree calculating means 51, and plural-designation-color storing means 54, and high-resolution image estimating means 52. The image processing device of the third exemplary embodiment, as compared with that of the second exemplary embodiment, differs in the plural-designation-color characteristic degree calculating means 51, the plural-designation-color storing means 54, and the high-resolution image estimating means 52, and generates the high-quality high-resolution image by changing the smoothness for a plurality of the color areas recorded in the plural-designation-color storing means 54.

Hereinafter, the details of operations of the plural-designation-color storing means 54 and the high-resolution image estimating means 52 will be explained.

The plural-designation-color characteristic degree calculating means 51 receives the magnified reference images generated by the reference low-resolution image magnifying means 33 as inputs, and calculates the designation color characteristic degrees hx1 to hxk for the colors (designation color 1 to designation color 1k: record number k) recorded in the plural-designation-color storing means 54 with regard to each pixel of the magnified reference image, respectively. The designation color characteristic degree hx1 to hxk have a value of 0.0 to 1.0, respectively, and it is meant that the color of the pixel approaches the corresponding color as the designation color characteristic degree approaches 1.0. For example, the color of the above pixel is regarded as a designation color 1 when the designation color characteristic degree hx1 of the pixel is 1.0, the color of the pixel approaches the color different from the designation color 1 as the designation color characteristic degree hx1 approaches zero, and the color of the above pixel becomes the color different from the designation color 1 when the designation color characteristic degree hx1 is zero. Hereinafter, it is assumed that the designation color characteristic degree for the designation color with a record number p of the pixel position i in the high-resolution image is described as hxp (i). Each designation color characteristic degree is calculated by applying the method of calculating the designation color characteristic degree of the second exemplary embodiment for respective designation colors.

The high-resolution image estimating means 52 receives the input low-resolution images, the motion vectors estimated by the motion estimating means 11, and a plurality of the designation color characteristic degrees calculated by the plural-designation-color characteristic degree calculating means 51 as inputs, and estimates the high-resolution image x that minimizes an evaluation function $g3(x)$ represented by Equation (9). Wherein, ˆ3 denotes a diagonal matrix of K×K and is calculated using the inputted characteristic degree like Equation (10). Further, i denotes a pixel position within the high-resolution image. Further, hxmax (i) and λmax (i) denote the characteristic degree of the designation color (record no. max) having a maximum designation color characteristic degree in the pixel position i, and a constant indicative of the intensity of the normalization term in the above designation color area, respectively. Additionally, the method of performing the synthesis responding to the designation color characteristic degree into which the previously prepared intensity of the normalization term in each designation color area has been inputted may be used for calculating the diagonal element of ˆ3.

[Numerical equation 9]

$$g_3(x) = \sum_{\forall n} (\|y_n - A_n x\|^2) + \|\Lambda_3 C(x)\| \qquad (9)$$

[Numerical equation 10]

$$\Lambda_3(i,i) = (1.0 - hx_{max}(i))\lambda_{max}(i) + hx_{max}(i)\lambda_{max}(i) \qquad (10)$$

Next, an operation of an entirety of this exemplary embodiment will be explained by referencing FIG. 5 and a flowchart of FIG. 6.

At first, the motion estimating means 11 receives N pieces of the low-resolution images as inputs, estimates the motion of the pixel between the reference low-resolution image, which is subjected to the enhancement of the image resolution, and the remaining (N−1) pieces of the to-be-referenced low-resolution images for each pixel thereof with sub-pixel accuracy, and outputs the estimated motion vectors (S001).

The reference low-resolution image magnifying means 33 magnifies the reference low-resolution image to be subjected to the enhancement of the image resolution, using the interpolation technique such as a Bi-cubic technique, and generates the magnified reference image having a size identical to that of the output high resolution image (S002).

The plural-designation-color characteristic degree calculating means 51 calculates the designation color characteristic degrees for a plurality of the colors stored in the pluraldesignation-color storing means 54 in each pixel of the magnified reference image, respectively (S203).

The high-resolution image estimating means 52 generates the high-quality high-resolution image by estimating the high-resolution image that minimizes the evaluation function g3($x$) (S204).

Additionally, in the aforementioned first to third exemplary embodiments, as a rule, the pixel number M of the low-resolution image is smaller than the pixel number K of the high-resolution images however, the aforementioned first to third exemplary embodiments may be applied also when M is equal to K, and when M is larger than K.

Using a constitution of the third exemplary embodiment makes it possible to change the method of reproducing the edges for each area and to generate the high-quality output image, and for example, it is possible to reproduce the areas such as leaves of trees and plains more sharply in some cases and to reproduce the skin color area smoothly in some cases within one piece of the output image.

Further, while each unit was constituted with hardware in the above-described exemplary embodiments, one part or an entirety thereof may be constituted with an information processing device that operates under a program.

Further, the content of the above-mentioned exemplary embodiments can be expressed as follows.

(Supplementary note 1) An image processing method, comprising:

receiving a plurality of images as inputs, and estimating a designation color characteristic degree indicative of a similarity between a pixel color of a generated image to be predicted from the input images and a pre-designated designation color; and changing a weight for an edge amount of each pixel within the image to be generated, based on said designation color characteristic degree, and generating the image in which an area of said designation color differs from other areas in a manner of reproduction of edges.

(Supplementary note 2) The image processing method according to Supplementary note 1, wherein said designation color is a skin color.

(Supplementary note 3) The image processing method according to Supplementary note 1 or Supplementary note 2, comprising:

configuring a plurality of the designation colors;
calculating, for said each designation color, the designation color characteristic degree of the pixel color of the generated image to be predicted from the input images; and changing the weight for an edge amount of each pixel within the image to be generated, based on the designation color characteristic degree for said each designation color, and generating the image in which an area of said each designation color differs from other areas in a manner of reproduction of the edges.

(Supplementary note 4) The image processing method according to Supplementary note 2 or Supplementary note 3, comprising, when said designation color is the skin color, magnifying a weight for the edge amount of the pixel predicted to have a color akin to the skin color within the generated image by said designation color characteristic degree.

(Supplementary note 5) The image processing method according to one of Supplementary note 1 to Supplementary note 4, wherein a resolution of said generated image is higher than that of said input image.

(Supplementary note 6) An image processing device, comprising:

designation color characteristic degree calculating means that receives a plurality of images as inputs, and estimates a designation color characteristic degree indicative of a similarity between a pixel color of a generated image to be predicted from the input images and a pre-designated designation color; and image generating means that changes a weight for an edge amount of each pixel within the image to be generated, based on said designation color characteristic degree, and generates the image in which an area of said designation color differs from other areas in a manner of reproduction of edges.

(Supplementary note 7) The image processing device according to Supplementary note 6, wherein said designation color is a skin color.

(Supplementary note 8) The image processing device according to Supplementary note 6 or Supplementary note 7, comprising storing means that stores a plurality of the designation colors:

wherein said designation color characteristic degree calculating means calculates, for said each designation color stored in said storing means, the designation color characteristic degree of the pixel color of the generated image to be predicted from the input images; and wherein said image generating means changes the weight for an edge amount of each pixel within the image to be generated, based on the designation color characteristic degree for said each designation color, and generates the image in which an area of said each designation color differs from other areas in a manner of reproduction of the edges.

(Supplementary note 9) The image processing device according to Supplementary note 7 or Supplementary note 8, wherein said image generating means magnifies a weight for the edge amount of the pixel predicted to have a color akin to the skin color within the generated image by said designation color characteristic degree when said designation color is the skin color.

(Supplementary note 10) The image processing device according to one of Supplementary note 6 to Supplementary note 9, wherein said image generating means generates an image that a resolution is higher than resolution of said input image.

(Supplementary note 11) A program for causing an information processing device to execute:

a designation color characteristic degree estimating process of receiving a plurality of images as inputs, and estimating a designation color characteristic degree indicative of a similarity between a pixel color of a generated image to be predicted from the input images and a pre-designated designation color; and an image generating process of changing a weight for an edge amount of each pixel within the image to be generated, based on said designation color characteristic degree, and generating the image in which an area of said designation color differs from other areas in a manner of reproduction of edges.

(Supplementary note 12) A program according to Supplementary note 11, wherein said designation color is a skin color.

(Supplementary note 13) A program according to Supplementary note 11 or Supplementary note 12, wherein said designation color characteristic degree estimating process comprises:

configuring a plurality of the designation colors;
calculating, for said each designation color, the designation color characteristic degree of the pixel color of the generated image to be predicted from the input images; and changing the weight for an edge amount of each pixel within the image to be generated, based on the designation color characteristic degree for said each designation color, and generating the image in which an area of said each designation color differs from other areas in a manner of reproduction of the edges.

(Supplementary note 14) A program according to Supplementary note 12 or Supplementary note 13, wherein said image generating process comprises, when said designation color is the skin color, magnifying a weight for the edge amount of the pixel predicted to have a color akin to the skin color within the generated image by said designation color characteristic degree.

(Supplementary note 15) A program according to one of Supplementary note 11 to Supplementary note 14, wherein said image generating process generates an image that a resolution is higher than resolution of said input image.

(Supplementary note 16) An image processing method of receiving a plurality of images as inputs, and generating a new image based on a similarity of the plurality of the input images and an evaluation of an edge amount in an entirety of the image, comprising;

estimating a designation color characteristic degree indicative of a similarity between a pixel color of a generated image to be predicted from the plurality of the input images and a pre-designated designation color; and
changing a weight for the edge amount of each pixel within the image to be generated, based on said designation color characteristic degree, and generating the image in which an area of said designation color differs from other areas in a manner of reproduction of edges.

(Supplementary note 17) An image processing device for receiving a plurality of images as inputs, and generating a new image based on a similarity of the plurality of the input images and an evaluation of an edge amount in an entirety of the image, comprising;

designation color characteristic degree calculating means that estimates a designation color characteristic degree indicative of a similarity between a pixel color of a generated image to be predicted from the plurality of the input images and a pre-designated designation color; and
image generating means that changes a weight for the edge amount of each pixel within the image to be generated, based on said designation color characteristic degree, and generates the image in which an area of said designation color differs from other areas in a manner of reproduction of edges.

(Supplementary note 18) A program of an information processing device for receiving a plurality of images as inputs, and generating a new image based on a similarity of the plurality of the input images and an evaluation of an edge amount in an entirety of the image, said program causing the information processing device to execute:

a designation color characteristic degree estimating process of estimating a designation color characteristic degree indicative of a similarity between a pixel color of a generated image to be predicted from the plurality of the input images and a pre-designated designation color; and an image generating process of changing a weight for the edge amount of each pixel within the image to be generated, based on said designation color characteristic degree, and generating the image in which an area of said designation color differs from other areas in a manner of reproduction of edges.

Above, although the present invention has been particularly described with reference to the preferred embodiments, it should be readily apparent to those of ordinary skill in the art that the present invention is not always limited to the above-mentioned embodiments, and changes and modifications in the form and details may be made without departing from the spirit and scope of the invention.

This application is based upon and claims the benefit of priority from Japanese patent application No. 2010-042289, filed on Feb. 26, 2010, the disclosure of which is incorporated herein in its entirety by reference.

INDUSTRIAL APPLICABILITY

The present invention may be applied to the apparatus for enhancement of the image resolution that generates the high-resolution images from a plurality of the low-resolution images. The present invention may be applied to not only still images but also a plurality of frames within the moving images as the input image, whereby the present invention may be applied to video apparatuses in general.

REFERENCE SIGNS LIST 10 super-resolution processing device
11 motion estimating means
12 high-resolution image estimating means
20 beautiful skin processing device
21 skin color characteristic degree calculating means
22 smoothing processing means
32, 42, and 52 high-resolution image estimating means
33 reference low-resolution image magnifying means
41 designation color characteristic degree calculating means
44 designation color storing means

The invention claimed is:

1. An image processing method, comprising:
configuring a plurality of designation colors;
receiving a plurality of images as inputs;
calculating, for each of the plurality of designation colors, a designation color characteristic degree indicative of a similarity between a pixel color of a generated image to be predicted from the input images and each designation color;
and
changing a weight for an edge amount of each pixel within the image to be generated, based on said designation color characteristic degree for each of the plurality of designation colors, and generating the image in which an area of each designation color differs from other areas in a manner of reproduction of edges.

2. The image processing method according to claim 1, wherein one of the plurality of designation colors is a skin color.

3. The image processing method according to claim 2, further comprising, when said designation color is the skin color, magnifying a weight for the edge amount of the pixel predicted to have a color akin to the skin color within the generated image by said designation color characteristic degree.

4. The image processing method according to claim 1, wherein a resolution of said generated image is higher than that of said input image.

5. An image processing device, comprising:
a storing means that stores a plurality of designation colors;
a designation color characteristic degree calculator that receives a plurality of images as inputs, and calculates, for each of said plurality of the designation colors stored in said storing means, a designation color characteristic degree indicative of a similarity between a pixel color of a generated image to be predicted from the input images and each designation color; and
image generator that changes a weight for an edge amount of each pixel within the image to be generated, based on said designation color characteristic degree for each of the plurality of designation colors, and generates the image in which an area of each designation color differs from other areas in a manner of reproduction of edges.

6. The image processing device according to claim 5, wherein one of the plurality of designation colors is a skin color.

7. The image processing device according to claim 6, wherein said image generator magnifies a weight for the edge amount of the pixel predicted to have a color akin to the skin color within the generated image by said designation color characteristic degree when said designation color is the skin color.

8. The image processing device according to claim 5, wherein a resolution of said generated image is higher than that of said input image.

9. A non-transitory computer readable storage medium storing a program for causing an information processing device to execute a method of:

receiving a plurality of images as inputs;

calculating, for each of a plurality of designation colors, a designation color characteristic degree indicative of a similarity between a pixel color of a generated image to be predicted from the input images and each designation color; and an image generating process of changing a weight for an edge amount of each pixel within the image to be generated, based on said designation color characteristic degree for each of the plurality of designation colors, and generating the image in which an area of each designation color differs from other areas in a manner of reproduction of edges.

\* \* \* \* \*